United States Patent [19]
Brimmage et al.

[11] Patent Number: 6,044,064
[45] Date of Patent: Mar. 28, 2000

[54] METHOD AND SYSTEM THEREFOR OF CONFINING PATH VERIFICATION SIGNALS WITHIN A DISTRIBUTED RESTORATION NETWORK

[75] Inventors: Ashley Brimmage; Bryan McGlade, both of Plano; Lee D. Bengston, Murphy; Jasvantrai C. Shah, Richardson; Mark Sees, Plano, all of Tex.

[73] Assignee: MCI Communications Corporation, Washington, D.C.

[21] Appl. No.: 08/825,441

[22] Filed: Mar. 28, 1997

[51] Int. Cl.[7] ........................................................ H04J 1/16
[52] U.S. Cl. ............................................ 370/248; 370/216
[58] Field of Search ..................... 370/248, 251, 370/252, 247, 241, 216, 227, 228, 389, 395, 249, 250, 253, 222, 223, 224, 225, 226, 351, 237, 238, 242, 244, 360, 355, 392, 529; 340/827, 825.01, 825.03; 395/181; 379/221

[56] References Cited

U.S. PATENT DOCUMENTS

5,721,727  2/1998  Ashi et al. .............................. 370/244
5,734,687  3/1998  Kainulaimen ........................... 370/248

*Primary Examiner*—Dang Ton

[57] ABSTRACT

In a restoration network including a distributed restoration algorithm (DRA) enabled network of a telecommunications network, path verification messages are embedded onto traffic bearing signals entering the network and removed from the signals leaving the network. By adding path verification messages to the signals that traverse within the DRA enabled network, the integrity of any communications path that interconnects the various nodes within the restoration network are confirmed. Further, by removing the path verification messages from the signals leaving the restoration network, equipment outside the restoration network are spared of any possibility that their operations may be affected by the path verification messages.

43 Claims, 6 Drawing Sheets

METHOD AND SYSTEM THEREFOR OF CONFINING PATH VERIFICATION SIGNALS WITHIN A DISTRIBUTED RESTORATION NETWORK

RELATED APPLICATIONS

This invention relates to application Ser. No. 08/483,525 now U.S. Pat. No. 5,623,481 and 08/483,579 now U.S. Pat. No. 5,862, 125, both filed Jun. 7, 1995, and assigned to the assignee of the instant invention. The disclosures of the '525 and '579 applications are incorporated by reference herein. This invention further relates to application entitled "Integration of a Path Verification Message Within a Signal" Ser. No. 08/825,440 filed Mar. 28, 1997, and assigned to the same assignee of this invention.

FIELD OF THE INVENTION

This invention relates to telecommunications networks and more particularly to an improvement wherein path verification signals are confined within a restoration network and specifically a distributed restoration network of a telecommunications network.

BACKGROUND OF THE INVENTION

In a telecommunications network having a plurality of interconnected nodes, certain portions of the network which include a number of the interconnected nodes may be defined to have the ability to restore traffic disrupted along paths formed from those nodes. Such defined concentration of nodes may be referred to as a distributed restoration network within the telecommunications network or simply a distributed restoration domain, or more specifically a dynamic transmission network restoration (DTNR) domain. The operation of such distributed restoration network depends on the distributed restoration algorithm (DRA) that is stored in the various nodes within the distributed restoration network.

As is well known, a path may be effected in the distributed restoration network by interconnecting a number of nodes therein, so that traffic may be routed along these interconnected nodes. To maintain the integrity of the path, per the above-referenced '088 application, there is disclosed the embedding of a path verification message onto the traffic signals so that each node along the path within the distributed restoration network is apprised of the integrity of the path. This path verification message could be integrated into an alarm indication signal (AIS). Thus, if at any time a break or a failure occurs along the path, an alarm signal, such as for example the AIS, would notify the nodes along the path that a failure has occurred and that the node should begin the restoration process to find alternate routes or paths to reroute the disrupted signal. A path interconnecting those nodes within the distributed restoration network may also extend into areas of the telecommunications network that are not adaptable to restore the disrupted traffic using DRA.

Given that those areas of the telecommunications network that are not DRA enabled may have equipment that could potentially be affected by the path verification messages that are embedded onto the traffic signals, a way must be found to remove the path verification messages from the traffic signals before those signals are routed from the distributed restoration network to the other areas of the telecommunications network. Moreover, since signals traversing outside of the distributed restoration network do not carry the path verification messages, path verification messages must be added to those signals that are being routed into the distributed restoration network.

It is therefore an objective of the present invention to provide a method and a system therefor of removing path verification messages from signals traversing from a distributed restoration network to areas of the telecommunications network that are not DRA enabled.

It is another objective of the present invention to provide a scheme and a system therefor of adding path verification messages to signals that are being routed to a distributed restoration network so that the integrity of any path formed within the distributed restoration network to which the signals are routed can be confirmed.

BRIEF DESCRIPTION OF THE DRAWINGS

The above-mentioned objectives and advantages of the present invention will become more apparent and the invention itself will be best understood by reference to the following description of the invention taken in conjunction with the accompanying drawings, wherein.

DETAILED DESCRIPTION OF THE PRESENT INVENTION

Figure 1:
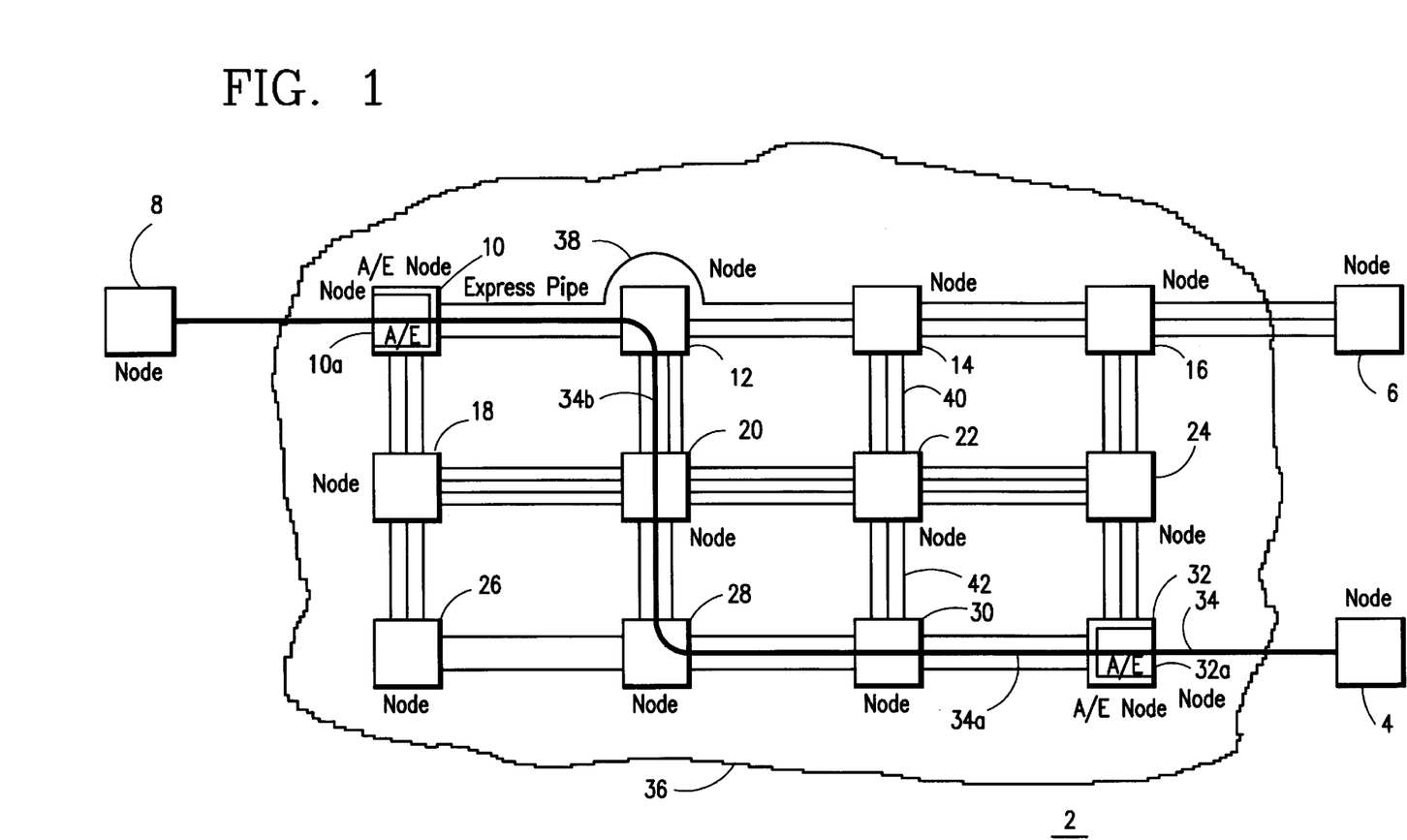
FIG. 1 is a diagram illustrating a telecommunications network having a plurality of interconnected nodes and more particularly a distributed restoration network defined by a plurality of those interconnected nodes.

With reference to FIG. 1, an exemplar telecommunications network 2 is shown to have a plurality of nodes, designated 4 to 32, interconnected as shown. A subset of those nodes, namely nodes 10 to 32, each are deemed to be adaptable to dynamically restore disrupted traffic insofar as each of those nodes has stored therein a distributed restoration algorithm (DRA).

A communications path 34, configured for example in a synchronous transport signal (STS) format such as STS-1, is shown to traverse between node 4 and node 8, and passing through nodes 32, 30, 28, 20, 12 and 10. As shown in FIG. 1, nodes 4 and 8 are outside the confines or boundary indicated by line 36. Thus, nodes 32 and 10 may be considered as the end nodes of the domain within line 36 which, as noted earlier, may be defined as a distributed restoration network, or a dynamic transmission network restoration (DTNR) domain within the telecommunications network. Note that even though one restoration domain, namely distributed restoration network 36, is shown in the telecommunications network of FIG. 1, in actuality, the telecommunications network can have a number of restoration domains dispersed therewithin each having a plurality of interconnected nodes adaptable to dynamically restore disrupted traffic traversing along a path within the restoration domain.

For the sake of simplicity, FIG. 1 is shown to have one domain within which are a number of interconnected nodes each equipped for distributed restoration. An exemplar communications path 34 interconnects and traverses through a number of those nodes and extends outside of restoration domain 36. As shown, nodes 10 and 32 for the exemplar path 34 are considered the end nodes of path 34 within domain 36. Each of nodes 10 and 32 may further be considered as an access/egress node equipped with at least one access/egress port, designated 10a and 32a, respectively, for interfacing between the restoration domain 36 and the other portions of the telecommunications network.

For the exemplar embodiment shown in FIG. 1, assume that traffic is being input to restoration domain 36 along communications path 34 by node 4. Thus, the traffic signals first enter access/egress port 32a of node 32, and then are cross-connected to a working link, such as for example link 34a, which in turn is connected to an adjacent node 30. Communications path 34 is further formed by the interconnections of the working links between the other intermediate nodes 28, 20, 12 and end node 10. Node 10 is the node from which the traffic signals are routed outside of restoration domain 36, to node 8 for example.

The nodes within restoration domain 36 can be dynamically interconnected to form various paths to reroute traffic around any failed portions of the network within restoration domain 36. For example, were a failure to occur on communications path 34 between nodes 12 and 20, or for that matter were node 20 to malfunction, alternate paths may be formed between the two end nodes 10 and 32 using various spare links available for rerouting the disrupted traffic. For the example shown in FIG. 1, assuming that communications path 34, and more specifically the working link connecting nodes 12 and 20 and designated 34b, were cut, an alternate path may be formed between end nodes 10 and 32 by way of nodes 14, 22, 30—assuming that express pipe 38 connecting node 10 to node 14, link 40 connecting node 14 to node 22, and link 42 connecting node 22 to node 30 are all available spare links. An alternate path that connects end node 10 to end node 32 therefore is formed from node 10 to node 14 to node 22 to node 30 and then to node 32. For the sake of convenience, this alternate path is designated 44 and is shown in FIG. 2.

Figure 2:
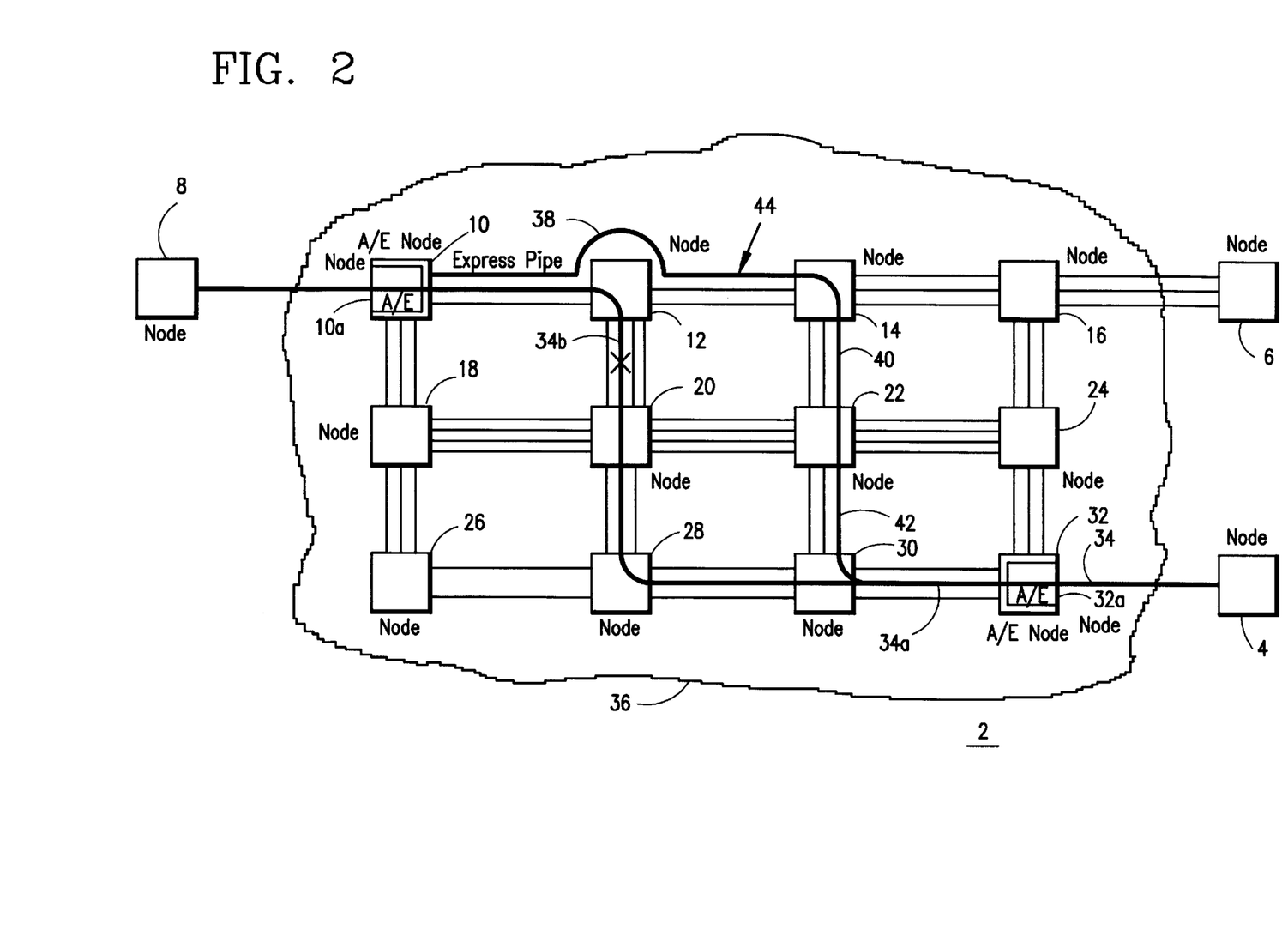
FIG. 2 shows the telecommunications network of FIG. 1 in which a cut has occurred in a communications path and an alternate path has been effected to reroute the disrupted traffic.

Note that the end nodes, namely nodes 10 and 32, for the respective communications paths shown in FIGS. 1 and 2 nonetheless remain constant. In other words, nodes 10 and 32 remain the end nodes for those communications paths in restoration domain 36 from which traffic traverses in and out of the domain despite the fault at link 34b. And in order to verify the integrity of the communications path, be it the original communications path 34 in FIG. 1 or the alternate communications path 44 in FIG. 2, the continuity of the communications path somehow needs to be continuously verified, so that traffic can be confidently routed to the path connecting those two end nodes. Putting it differently, verification must be performed to ensure that a signal received at the appropriate transceiving port of one node is in fact the same signal that was dispatched from a particular transceiving port of another given node within restoration domain 36. Thus, for the exemplar cases shown in FIGS. 1 and 2, assuming that a traffic signal is provided to node 32 from node 4 at access/egress port 32a and a signal is to be provided from access/egress port 10a of node 10 to node 8, verification must be made to ensure that the signal that was transmitted from node 32 at port 32a indeed is the same signal that arrives at access/egress port 10a of node 10. The integrity of the communications path, be it the optimal or alternate path, therefore has to be verified.

One way of verifying the integrity of a communications path is to send path verification signals from one to the other of the end nodes within the restoration domain. However, these path verification signals must be implemented within the format of the signals being transmitted, e.g., the digital service 3 (DS3) format, the synchronous transport signal (STS) format, and other well-known formats for example. At the same time, the path verification signals must not interfere with the operation of other equipment or facilities that may be connected to the network. Thus, the propagation of the path verification signals needs to be confined within the boundary of the restoration domain, for example within the bounds of restoration domain 36.

Having said that, it needs to be remembered that the path verification signals are needed to ensure the integrity of the communications path within the restoration domain. Therefore, path verification signals in the form of messages have to be added to traffic signals being input to restoration domain 36, since the assumption is that no such path verification signals are present in the traffic signals traversing through those portions of the telecommunications network not adapted to have the dynamic distributed restoration ability. Thus, at those boundaries in the telecommunications network where a distributed restoration domain meets a non-DRA domain, depending on which direction the traffic signal is traversing, a path verification message has to be either removed, or added, to the traffic signal.

Figure 3:
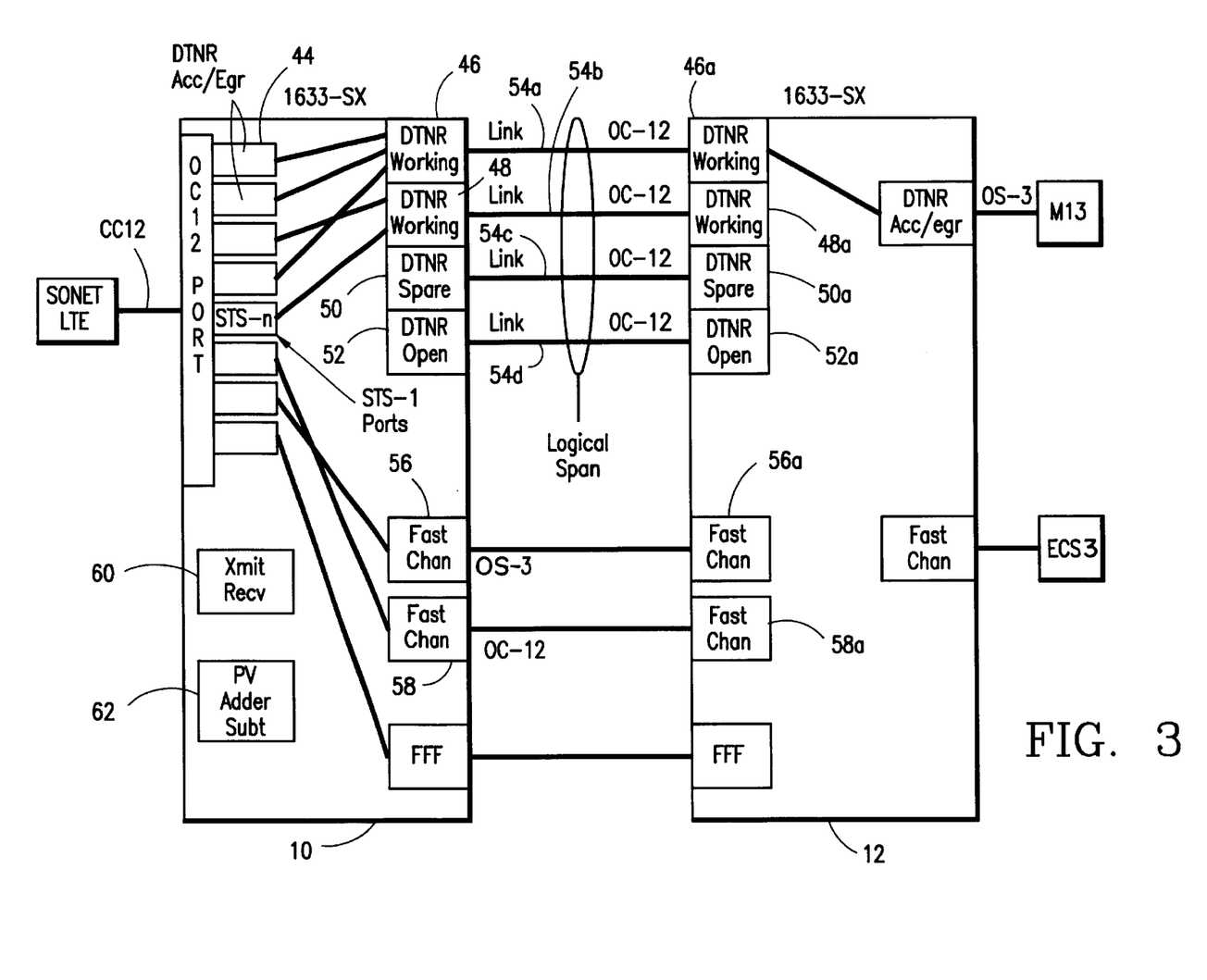
FIG. 3 is an illustration of two interconnected nodes within the distributed restoration network, one of the nodes being an end node of the distributed restoration network that acts as a bridge to areas of the telecommunications network outside of the distributed restoration network.

FIG. 3 shows two adjacent interconnected digital cross-connect switches (DCSs) 10 and 12 made, for example, by the Alcatel Company having manufacturing number 1633-SX. As shown, each of the DCSs has a number of DTNR access/egress ports, in the form of interface cards, designated 44. Each of these access/egress ports may be interfaced to a synchronous transport signal (STS-n) circuit, such as for example a STS-1 circuit. As shown, each of the DCSs 10 and 12 has two working link interfaces 46, 46a and 48, 48a, and a spare interface 50, 50a. Respective links 54a and 54b connect the working interfaces of DCSs 10 and 12. Similarly, link 54c connects the spare interfaces 50 and 50a while link 54*d* connects the open interfaces 52 and 52*a* of nodes 10 and 12, respectively. A processor (not shown) in each of the DCSs controls the operations of the DCS and its various interfaces. A memory (also not shown) stores the program instructions and other information necessary for the operation of each of the DCSs.

For the DCSs shown in FIG. 3, it suffices to say that there are two channel interfaces 56, 56*a* and 58, 58*a* in each of the switches for providing a different type of restoration, namely a real time restoration (RTR) platform between the nodes. RTR is a restoration scheme that is different from the distributed restoration scheme of the instant invention and will be further discussed, infra, as another embodiment of this invention.

To conform with restoration domain 36 shown in FIGS. 1 and 2, DCS 10 is one end node of communications path 34 which other end node is 32. As shown, the output from DCS 10 is provided to an optical fiber line terminating equipment (LTE) which in turn forwards, i.e. transports, the output of communications path 34 to a working link of node 8 outside of restoration domain 36. See FIG. 1.

For each of the nodes 10 and 12 shown in FIG. 3, note that each of the access/egress ports is identified as DTNR or (DRA) enabled. In other words, each of those access/egress ports is adaptable to dynamically restore disrupted traffic, i.e. able to find an alternate path, if it senses an alarm signal from an adjacent node which may actually originate from several nodes downstream or upstream thereof. For the instant invention, even though the access/egress ports are adaptable to receive and transmit signals, for illustration purposes, a transmit/receive module 60 is shown to be resident in node 10. Also shown to be resident in node 10 is a path verification (PV) add/subtract module 62. Both transmit/receive module 60 and path verifier add/subtract module 62 are assumed to work hand-in-hand with the different access/egress ports 44 of node 10.

Note that even though transmit/receive module 60 and path verifier add/subtract module 62 are shown only in node 10, it should be appreciated that both of those modules are resident in all of the nodes that may act as end nodes for a path defined within restoration domain 36. For example, were node 12 to be an end node that bridges restoration domain 36 to some node in the telecommunication network that is not DRA enabled, then its path verifier add/subtract module would come into play. Thus, for the instant invention, the path verifier add/subtract module comes into play only if the node in which it is resident becomes an end node of a path that extends outside of the restoration domain.

For the telecommunications network of the instant invention, it is assumed that traffic may be carried in a DS3 format, a STS format or other well known formats. Therefore, notwithstanding the STS ports 44 shown in node 10 of FIG. 3, it should be appreciated that DS3 ports are equally applicable for the functioning of the instant invention.

The path verifier add/subtract module 62 of the present invention, as its name implies, can either add or remove a path verification message from a signal traversing across the end node, for example end node 10. For the case in hand, given that end node 10 is assumed to have received an input signal from its adjacent node 12 and the signal is to be routed outside of restoration domain 36, path verifier add/subtract module 62 would remove the path verification message that presumably has been added, or embedded, onto the traffic signal. Thus, the traffic signal that outputs from end node 10 is devoid of any path verification message that may affect equipment or apparatus in the non DRA enabled portions of the telecommunications network.

Conversely, for end node 32 shown in FIG. 1 which is assumed to have the same configuration as that of node 10 shown in FIG. 3, when it is in receipt of an input signal from node 4, its path verifier add/subtract module will add a path verification message to the signal for transport along communications path 34. For those nodes along communications path 34 that are bracketed by end nodes 10 and 32, i.e. the intermediate DCSs within the restoration domain 36, the embedded path verification messages on the signals are transparent, since each of those DCSs is DRA capable.

Figure 4:
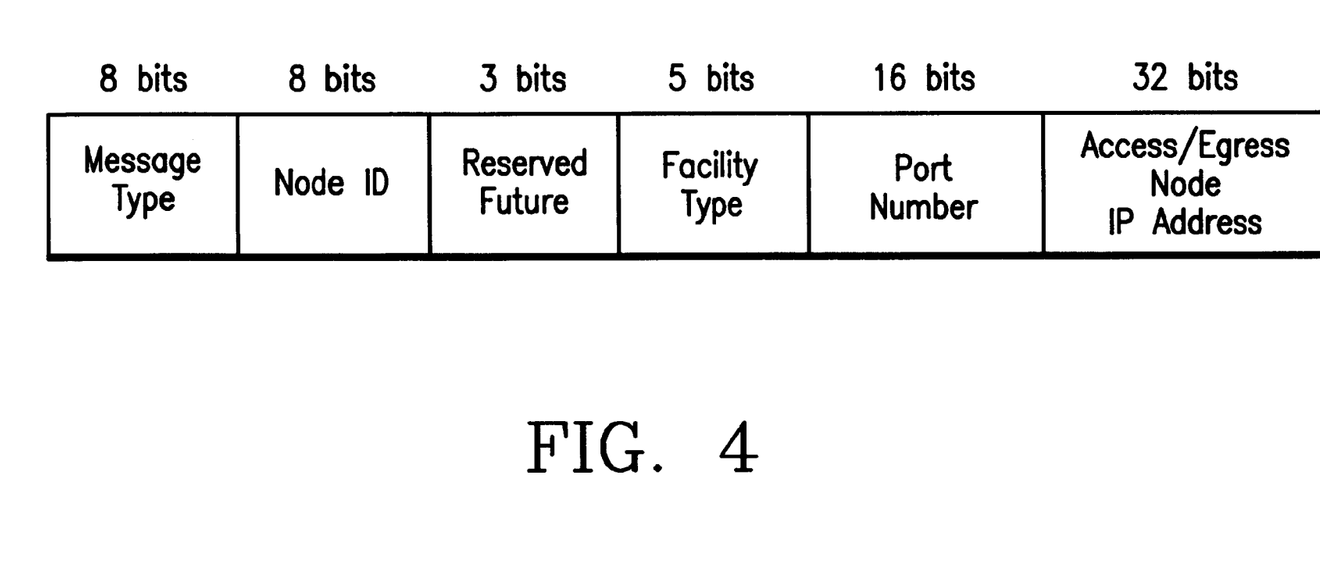
FIG. 4 shows the structure of an exemplar structure of an exemplar verification message embedded to the traffic signal.

FIG. 4 shows an exemplar structure of an exemplar path verification message that is embedded onto the traffic signals traversing through the distributed restoration network, i.e. restoration domain 36. In the case of a DS3 signal, the path verification message, in the form of the structure shown in FIG. 4, is embedded to the X-bit of the DS3 signal. Since the format of a DS3 signal is well known, it suffices to note that the X-bits are located at the beginning at the first and second M subframes of the M frame of the DS3 signal. The specifics of how a path verification message may be integrated into a signal by using the X-bit is disclosed in the aforenoted '088 co-pending application.

As shown in FIG. 4, the exemplar path verification message, if it is to be embedded onto the X-bit of the DS3 signal, has 13 bits. The first two bits are used to synchronize the message with the DS3 signal. The middle three bits are used for identifying the various parts of the path verification message. And the last eight bits are used to identify the access/egress node and the Internet protocol (IP) address thereof. Thus, the path verification message is able to identify the end node, and more particularly the access/egress port at that end node from which it either originates or is destined for. Accordingly, if an end node, for example end node 10 shown in FIG. 1, receives a path verification message that is embedded onto a signal sent thereto, the end node will know that there is a communications path that connects it to the origination end node, for example end node 32, and the access/egress port from which the signal originated. The X-bit type path verification message could also be used if the DS3 signal to which it is embedded traverses via SONET transmission, such as shown in FIG. 3.

The interconnections of the various nodes in a distributed restoration network may also be formed by STS circuits, such as STS-1, STS-3C, or STS-12C, or other node interconnectable circuits. In the case that STS type circuits are used for interconnecting the nodes, assuming the path verification message to have the format shown in FIG. 4, it suffices to state that the path verification message shown in FIG. 4 is embedded onto a portion of the Z5 byte of the STS signal. Thus, the Z5 path verification message is assumed to have a message type 2 for designating that it is a path verification message. Similar to the X-bit path verification message, the Z5 path verification message also references the specific access/egress port and the IP address of the end node.

Figure 5:
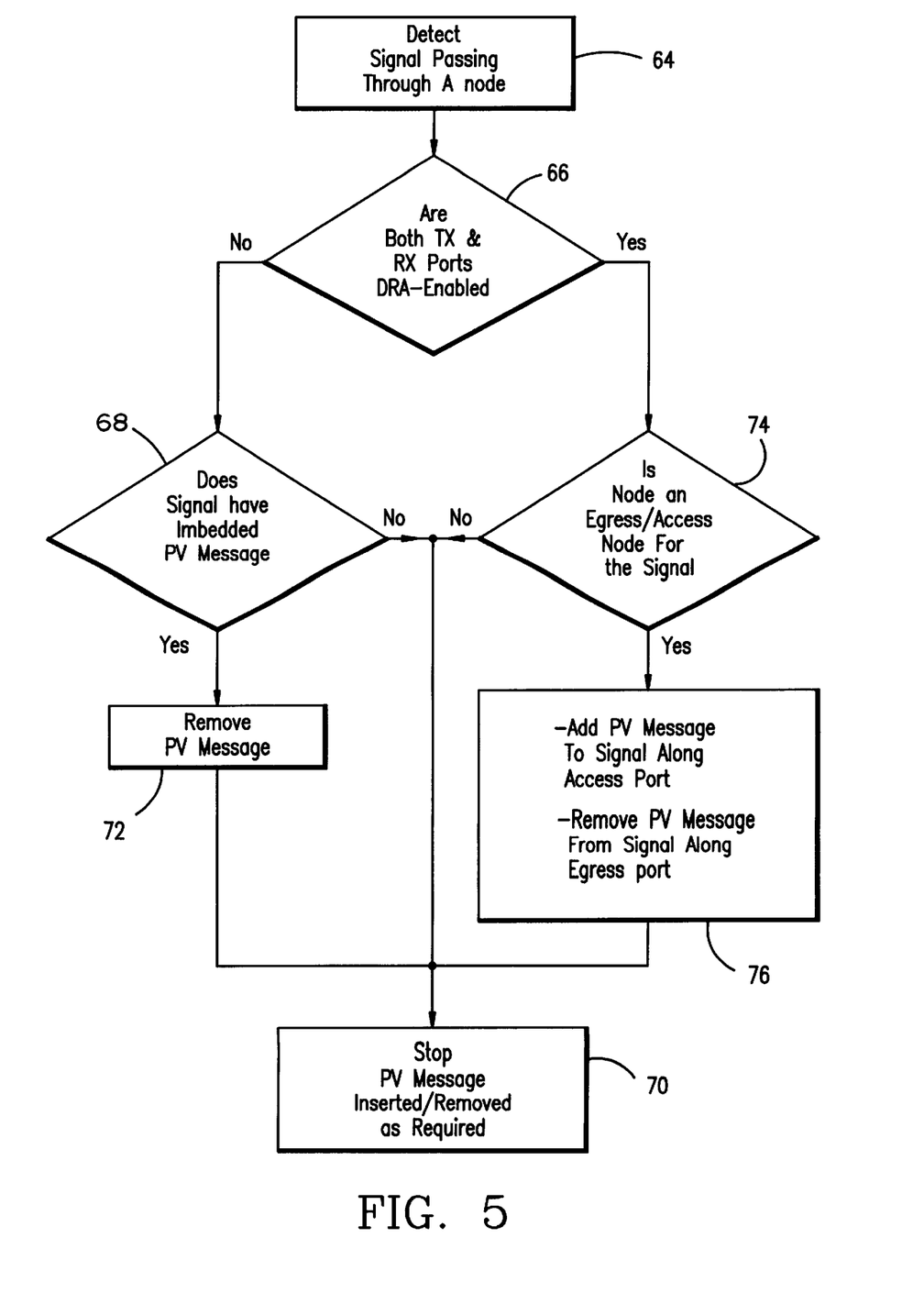
FIG. 5 is a flow chart illustrating the operation of the present invention.

With reference to FIG. 5, the operation of the system of the present invention is as follows. The process begins at step 64 when a signal arrives at an access port of a node and is sensed thereby. A determination is then made by the node on whether its transmit and receive ports are DRA enabled in step 66. If those ports are not DRA enabled, then a further determination is made in step 68 on whether the signal has embedded therein a path verification message. If there is not, the process stops, as indicated at step 70. However, if it is determined that a path verification message is indeed embedded onto the signal, the process proceeds to step 72 at which time the path verification message is removed. The process then stops.

If, per step 66, it is found that both the transmit and receive ports of the node are adaptable to dynamically restore disrupted traffic, the process proceeds to step 74 where a determination is made on whether the node is an end node, i.e. an egress/access node that acts as a bridge between the restoration domain and the parts of the telecommunications network that are not DRA enabled. If it is determined in step 74 that the node is not an end node, the process stops, per step 70, insofar as no attention needs to be paid to any path verification messages embedded onto the signal. Putting it simply, the path verification messages are transparent to that intermediate node.

On the other hand, if step 74 determines that the node is indeed an end node, then a path verification message is added to the signal at the access port, and the path verification message, if any, is removed from the signal at the egress port before the signal is transmitted by the end node to the non-DRA enabled portion of the telecommunications network. See step 76. Thereafter, the process stops per step 70, until the next signal is detected.

Figure 6:
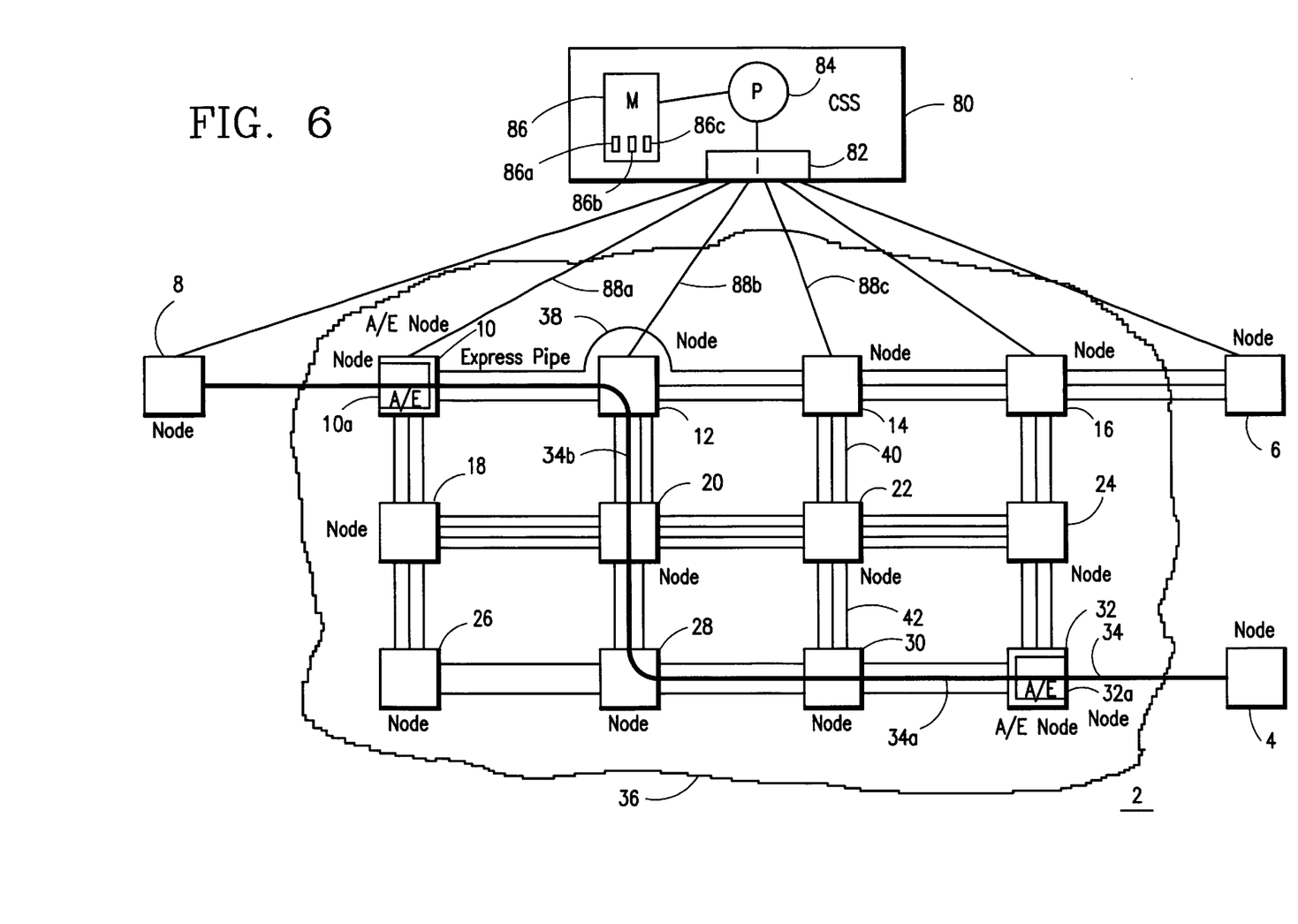
FIG. 6 illustrates a second embodiment of the invention wherein a non-DRA restoration network is shown to comprise a plurality of interconnected nodes each being monitored by an operation support system.

With reference to FIG. 6, a second embodiment of the instant invention is given for the aforenoted Real Time Restoration Scheme. As shown, an operation support system (OSS) 80 is connected separately to each of the nodes of telecommunications network 2. For the sake of clarity, note that only nodes 8, 10, 12, 14, 16 and 6 are shown to be connected to OSS 80 in FIG. 6. In actuality, each of the nodes in the embodiment shown in FIG. 6 has a link directly connecting it to the interface unit 82 of OSS 80, so that bidirectional communication is effected between OSS 80 and each of the nodes of the embodiment shown in FIG. 6. Thus, the goings on in each of the nodes is monitored by OSS 80, and instructions are provided by OSS 80 to each of the nodes so that specific functions may be ordered to be performed in particular ones of the nodes. Such functions may include the initiation of a restoration subsequent to the OSS 80 having detected a malfunctioning of a link that forms a part of the path in the restoration domain 36. The fact that the condition of each of the nodes has to be monitored by OSS 80 is dictated by the fact that, in a real time restoration scheme, it is assumed that the nodes are not provided with a DRA algorithm, so that restoration cannot be effected dynamically by each of the nodes that senses a break of a link connected thereto, or downstream thereof.

To achieve this central control, OSS 80 includes a processor 84 and a memory 86 communicatively connected thereto and from which it can retrieve and transmit information. Memory 86 is used to store a plurality of tables each corresponding to one of the nodes. Each of the tables in turn has stored therein instructions specific to its node for instructing the node to reroute traffic passing therethrough in particular ways in response to particular breaks that occur to links connected thereto. For example, table 86a may be reserved specifically for access/egress node 10 while table 86c is specifically reserved to operate with access/egress node 32. In the meantime, table 86b in memory 86 may be reserved for the functioning of node 12. Thus, if for example a break 34b has occurred as before shown in FIG. 2, this break at first is detected by OSS 80. Process 84 then communicates with memory 86, and specifically with the table store 86a for retrieving instructions therein to instruct node 10 on how to route the disrupted traffic. For the exemplar case shown in FIG. 2, assuming that express pipe 38 is to be used to route the disrupted traffic from node 10 to node 14, the appropriate instructions will be retrieved by processor 84 from table 86a and routed by the appropriate link, for example 88a to node 10 to instruct node 10 to route the traffic originally destined for node 12 to node 14 via express pipe 38. At the same time, by means of link 88c to node 14, the appropriate instructions are retrieved by processor 84 from the appropriate table stored within memory 86 for node 14 to further instruct node 14 to reroute the disrupted traffic next to node 22, as shown in FIG. 2. Other appropriate instructions are likewise retrieved by processor 84 from the appropriate tables in memory 86, and fed to the corresponding nodes for effecting the alternate route as shown in FIG. 2.

In terms of the removal and adding of a path verification message at the end nodes of the real time restoration scheme of FIG. 6, note that such adding/removal of a path verification message for the real time restoration scheme is similar to that of the DRA scheme. In other words, the adding/removal of a path verification message at the access/egress port of an end node of the restoration domain is dependent only on a determination of whether the transmit and receive ports at the end nodes have been provisioned to have a "path violation detection" (PV3) feature and whether or not the node that is so enabled is indeed an end node. Putting it simply, the add/removal of a path verification message for the real time restoration scheme of FIG. 6 is identical to that of the DRA restoration scheme, i.e., both being dependent on step 66 and 74 shown in the flow chart of FIG. 5. Thus, for the real time restoration scheme of FIG. 6, the nodes that are deemed to be the end nodes having the appropriate access/egress ports are provisioned by the management of the network prior to the operation of the restoration scheme so that the PV3 feature is enabled, thereby defining those nodes that have the provisioned access/egress ports as end nodes. Thus, for the real time restoration scheme of FIG. 6, when a signal arrives at a port on a node, a determination is made by the node on whether the PV3 feature is enabled on that port. If the PV3 feature is not enabled, the process would stop because the port is determined not be an access/egress port. On the other hand, if the PV3 feature is determined to be enabled, then a further determination is made on whether the signal has embedded therein a path verification message. If there is not, the process stops. However, if it is determined that a path verification message is indeed embedded onto the signal, the process proceeds to a further step at which time the path verification message is removed (if the signal is leaving the restoration domain) or added (if the signal is incoming to the restoration domain). The process then stops.

In sum, OSS 80 acts as a central processing system which, by its being connected to each of the plurality of nodes in the network, monitors the respective operations of each of the nodes. And upon the continuous monitoring of the operations of each of the nodes, appropriate instructions may be retrieved by the processor within OSS 80 and provided to the respective nodes so as to instruct each of those nodes to reroute traffic disrupted due to malfunctioning of the path through which the traffic traverses. Moreover, in the event that a signal is input to the restoration domain wherein the nodes are equipped to find alternate routes for rerouting disrupted traffic, the appropriate instructions will be provided by OSS 80 to the nodes that connect the path though the restoration domain. At the other end of the path, OSS 80 monitors the arrival of the signal at the access/egress node of the restoration network. In addition to monitoring the respective operations of the interconnected nodes within the restoration network, OSS 80 also monitors the integrity of the links interconnecting the various nodes of the network, and particularly those links and interconnected nodes that form paths through which signals traverse across the restoration network.

While a preferred embodiment of the present invention is disclosed herein for purposes of explanation, numerous changes, modifications, variations, substitutions and equivalents, in whole or in part, should now be apparent to those skilled in the art to which the invention pertains. Accordingly, it is intended that the invention be limited only by spirit and scope of the hereto appended claims.

We claim:

1. In a telecommunications network having a plurality of interconnected nodes and at least one dynamic transmission restoration domain including a subset of said interconnected nodes wherein at least one alternate path is established to reroute traffic disrupted when a path in said domain is cut, a method of preventing signals for verifying the integrity of various paths in said domain from venturing outside of said domain, comprising the steps of:

a) determining at each node in receipt of a signal whether its access and egress ports are adaptable to dynamically restore disrupted traffic;

b) examining said signal to determine if a path verification message is embedded therein if said access and egress ports of said each node are determined not adaptable to dynamically restore disrupted traffic; and c) removing any path verification message found to be embedded in said signal.

2. The method of claim 1, wherein said signal is a digital service (DS3) signal and wherein said path verification message is embedded onto the X-bits of said DS3 signal.

3. The method of claim 1, wherein said signal is a synchronous transport signal (STS) and wherein said path verification message is embedded onto a portion of the Z5 byte of said STS signal.

4. In a telecommunications network having a plurality of interconnected nodes and at least one dynamic transmission restoration domain including a subset of said interconnected nodes wherein at least one alternate path is established to reroute traffic disrupted when a path is cut, a method of confining signals for verifying the integrity of various paths in said domain within said domain, comprising the steps of:

a) determining at each node in receipt of a signal whether its access and egress ports are adaptable to dynamically restore disrupted traffic;

b) determining if said each node is an access/egress node of said domain if its access and egress ports are determined to be adaptable to dynamically restore disrupted traffic; and c) if said each node is determined to be an access/egress node, embedding a path verification message to said signal if said signal is input from outside of said domain to said each node, and removing any path verification message embedded onto said signal if said signal is being output from said each node out of said domain.

5. The method of claim 4, wherein said signal is a digital service (DS3) signal and wherein said path verification message is embedded onto the X-bits of said DS3 signal.

6. The method of claim 4, wherein said signal is a synchronous transport signal (STS) and wherein said path verification message is embedded onto a portion of the Z5 byte of said STS signal.

7. In a telecommunications network having a plurality of interconnected nodes and at least one dynamic transmission restoration domain, a method of confining path verifying signals to said restoration domain, comprising the steps of:

a) defining said domain to include a subset of said plurality of interconnected nodes each adaptable to reroute traffic disrupted along a path connecting two end nodes of said domain;

b) embedding a path verification message onto a signal being routed to said path when said signal reaches one of said end nodes of said domain;

c) routing said signal with the embedded path verification message from said one end node to the other of said end nodes along said path to confirm the integrity of said path within said domain; and d) removing said embedded path verification message from said signal before said signal is routed by said other end node out of said domain.

8. The method of claim 7, further comprising the step of:

provisioning each of said end nodes with at least one access/egress port for routing traffic signals traversing along said path into and out of said domain.

9. The method of claim 7, wherein said signal is a digital service (DS3) signal and wherein said path verification message is embedded onto the X-bits of said DS3 signal.

10. The method of claim 7, wherein said signal is a synchronous transport signal (STS) and wherein said path verification message is embedded onto a portion of the Z5 byte of said STS signal.

11. A telecommunications network, comprising:

a plurality of interconnected nodes;

at least one dynamic transmission restoration domain defined by a number of said interconnected nodes each having at least one access/egress port adaptable to dynamically reroute traffic disrupted when a path in said domain is cut, a number of said interconnected nodes in said domain forming at least one path for routing traffic into and out of said domain, said path extending outside of said domain into said network;

wherein the two end nodes in said domain for providing ingress and egress into and out of said domain, respectively, each, when in receipt of a signal being output from said domain, examines said signal to determine if a path verification message is embedded therein; and wherein said each end node removes path verification message found embedded in said signal.

12. The telecommunications network of claim 11, wherein said each end nodes of said domain, when in receipt of a signal from said network outside of said domain, adds a path verification message to said signal and forwards said path verification message embedded signal along said path to a downstream node.

13. The telecommunications network of claim 11, wherein said signal is a digital service (DS3) signal and wherein said path verification message is embedded onto the X-bits of said DS3 signal.

14. The telecommunications network of claim 11, wherein said signal is a synchronous transport signal (STS) and wherein said path verification message is embedded in a portion of the Z5 byte of said STS signal.

15. A dynamic transmission restoration domain in a telecommunications network, comprising:

a plurality of interconnected nodes each adaptable to reroute traffic disrupted along a path connecting two end nodes of said domain;

means in each of said two end nodes for embedding a path verification message onto a signal being routed along said path;

means in said each end node for sending said signal having said path verification message embedded therein to the other of said end nodes along said path to confirm the integrity of said path within said domain; and means in said other end node for removing said embedded path verification message from said signal before said signal is routed by said other end node out of said domain.

16. The restoration domain of claim 15, wherein said each end node further comprises:

at least one access/egress port for routing traffic traversing along said path into and out of said domain.

17. The restoration domain of claim 15, wherein said signal is a digital service (DS3) signal and wherein said path verification message is embedded onto the X-bits of said DS3 signal.

18. The restoration domain of claim 15, wherein said signal is a synchronous transport signal (STS) and wherein said path verification message is embedded onto a portion of the Z5 byte of said STS signal.

19. In a telecommunications network having a central control processing system for monitoring the operation of a plurality of interconnected nodes and at least one restoration domain including a subset of said interconnected nodes wherein it is adaptable to establish at least one alternate path to reroute traffic disrupted when a path in said domain is cut, a method of preventing signals for verifying the integrity of paths in said domain from venturing outside of said domain, comprising the steps of:

a) for each of said plurality of interconnected nodes in said restoration domain in receipt of a signal, determining whether said each node is adaptable to restore disrupted traffic;

b) examining said signal to determine if a path verification message is embedded therein if said each node is determined not adaptable to restore disrupted traffic; and c) removing any path verification message found to be embedded in said signal.

20. The method of claim 19, further comprising the step of:

determining whether at least one access/egress port of said each node has been provisioned to be path violation detection enabled.

21. The method of claim 19, wherein said signal is a digital service (DS3) signal and wherein said path verification message is embedded onto the X-bits of said DS3 signal.

22. The method of claim 19, wherein said signal is a synchronous transport signal (STS) and wherein said path verification message is embedded onto a portion of the Z5 byte of said STS signal.

23. In a telecommunications network having a plurality of interconnected nodes and at least one restoration domain including a subset of said interconnected nodes wherein at least one alternate path is established to reroute traffic disrupted when a path is cut, a method of confining signals for verifying the integrity of various paths in said domain within said domain, comprising the steps of:

a) determining at each node in receipt of a signal whether said each node is adaptable to restore disrupted traffic;

b) determining if said each node is an access/egress node of said domain if said each node is determined to be adaptable to restore disrupted traffic; and c) if said each node is determined to be an access/egress node, embedding a path verification message to said signal if said signal is input from outside of said domain to the said each node, and removing any path verification message embedded onto said signal if said signal is being output from said each node out of said domain.

24. The method of claim 23, further comprising the step of:

provisioning at least one access/egress port of the access/egress node determined to be adaptable to restore disrupted traffic with a path violation detection feature for the operation of step c.

25. The method of claim 23, wherein said signal is a digital service (DS3) signal and wherein said path verification message is embedded onto the X-bits of said DS3 signal.

26. The method of claim 23, wherein said signal is a synchronous transport signal (STS) and wherein said path verification message is embedded onto a portion of the Z5 byte of said STS signal.

27. In a telecommunications network having a plurality of interconnected nodes whose respective operations being monitored by a central processing system, said network having at least one restoration domain, a method of confining path verifying signals to said restoration domain, comprising the steps of:

a) defining said restoration domain to include a subset of said plurality of interconnected nodes each adaptable to reroute traffic disrupted along a path connecting two end nodes of said restoration domain;

b) embedding a path verification message onto a signal being routed to said path when said signal reaches one of said end nodes of said restoration domain;

c) routing said signal with the embedded path verification message from said one end node to the other of said end nodes along said path to confirm the integrity of said path within said restoration domain; and d) removing said embedded path verification message from said signal before said signal is routed by said other end node out of said domain.

28. The method of claim 27, further comprising the step of:

provisioning each of said end nodes with at least one access/egress port adaptable for removing said embedded path verification message from said signal and for routing traffic signals traversing along said path into and out of said domain.

29. The method of claim 27, wherein said signal is a digital service (DS3) signal and wherein said path verification message is embedded onto the X-bits of said DS3 signal.

30. The method of claim 27, wherein said signal is a synchronous transport signal (STS) and wherein said path verification message is embedded onto a portion of the Z5 byte of said STS signal.

31. A telecommunications network, comprising:

a plurality of interconnected nodes;

at least one restoration domain defined by a number of said interconnected nodes each having at least one access/egress port adaptable to reroute traffic disrupted when a path in said domain is cut, a number of said interconnected nodes in said domain forming at least one path for routing traffic into and out of said domain, said path extending outside of said domain into said network;

wherein when either of the two end nodes in said domain for providing access and egress into and out of said domain, respectively, is in receipt of a signal being output from said domain, an examination is effected on said signal to determine if a path verification message is embedded therein; and wherein, if a path verification message is determined to be embedded in said signal, said path verification message is removed from said signal at said either end node before said signal is output from said domain.

32. The telecommunications network of claim 31, wherein when said either end node of said domain is in receipt of a signal from said network outside of said domain, a path verification message is added to said signal before said path verification message embedded signal is routed along said path to a downstream node.

33. The telecommunications network of claim 31, further comprising:

a central processing system for monitoring the respective operations of said interconnected nodes and the integrity of respective links interconnecting said interconnected nodes in said restoration domain; and wherein instructions are retrieved from said central processing system by each of said number of interconnected nodes on how to reroute the disrupted traffic.

34. The telecommunications network of claim 31, further comprising:

a central processing system for monitoring the respective operations of said interconnected nodes and the integrity of respective links interconnecting said interconnected nodes in said restoration domain; and wherein said end nodes each are provisioned to add said path verification message to said signal before routing said signal to a downstream node in said domain.

35. The telecommunications network of claim 31, further comprising:

a central processing system for monitoring the respective operations of said interconnected nodes and the integrity of respective links interconnecting said interconnected nodes in said restoration domain; and wherein said end nodes each are provisioned to remove said path verification message from said signal before outputting said signal from said domain.

36. The telecommunications network of claim 31, further comprising:

a central processing system including a store means for storing respective predetermined routes and instructions to be provided to respective ones of said interconnected nodes in said restoration domain to reroute traffic disrupted due to malfunction of at least one link interconnected thereto.

37. The telecommunications network of claim 31, wherein said signal is a digital service (DS3) signal and wherein said path verification message is embedded onto the X-bits of said DS3 signal.

38. The telecommunications network of claim 31, wherein said signal is a synchronous transport signal (STS) and wherein said path verification message is embedded in a portion of the Z5 byte of said STS signal.

39. A signal transmission restoration domain in a telecommunications network, comprising:

a plurality of interconnected nodes each adaptable to reroute traffic disrupted along a path connecting two end nodes of said domain;

means in each of said two end nodes for embedding a path verification message onto a signal being routed along said path;

means in said each end node for sending a signal having said path verification message embedded therein to the other of said end nodes along said path to confirm the integrity of said path within said domain; and means in said each end node for removing any path verification message embedded in a signal received thereat before routing said signal out of said domain.

40. The restoration domain of claim 39, further comprising:

a central processing system connected to each of said plurality of nodes for monitoring the respective operations of said plurality of nodes, said central processing system including a store means for storing respective predetermined routes and instructions to be provided to respective ones of said interconnected nodes to reroute traffic to be routed therethrough but is disrupted due to malfunction of at least one link interconnected thereto;

wherein said each end node is provisioned to embed said path verification message to said signal being routed along said path into said domain and said other end node is provisioned to remove said embedded path verification message from said signal before routing said signal out of said domain.

41. The restoration domain of claim 39, wherein said each end node further comprises:

at least one access/egress port provisioned for routing traffic traversing along said path into and out of said domain and for adding or removing said path verification message onto or from, respectively, said signal.

42. The restoration domain of claim 39, wherein said signal is a digital service (DS3) signal and wherein said path verification message is embedded onto the X-bits of said DS3 signal.

43. The restoration domain of claim 39, wherein said signal is a synchronous transport signal (STS) and wherein said path verification message is embedded onto a portion of the Z5 byte of said STS signal.

* * * * *